J. H. PRESS.
MOTOR VEHICLE.
APPLICATION FILED NOV. 12, 1915.

1,348,241.

Patented Aug. 3, 1920.
3 SHEETS—SHEET 1.

Witnesses

Inventor
Jacob H. Press

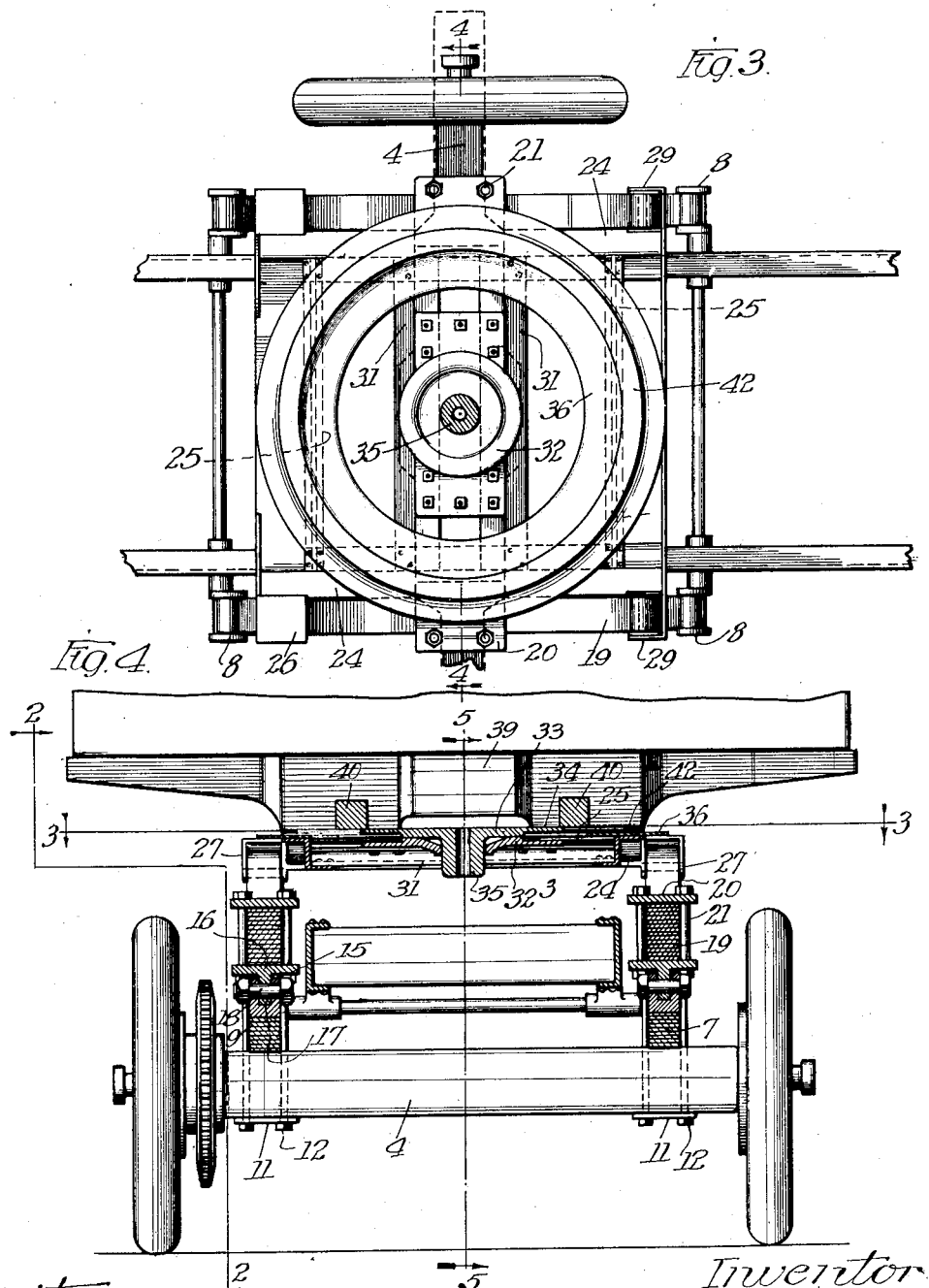

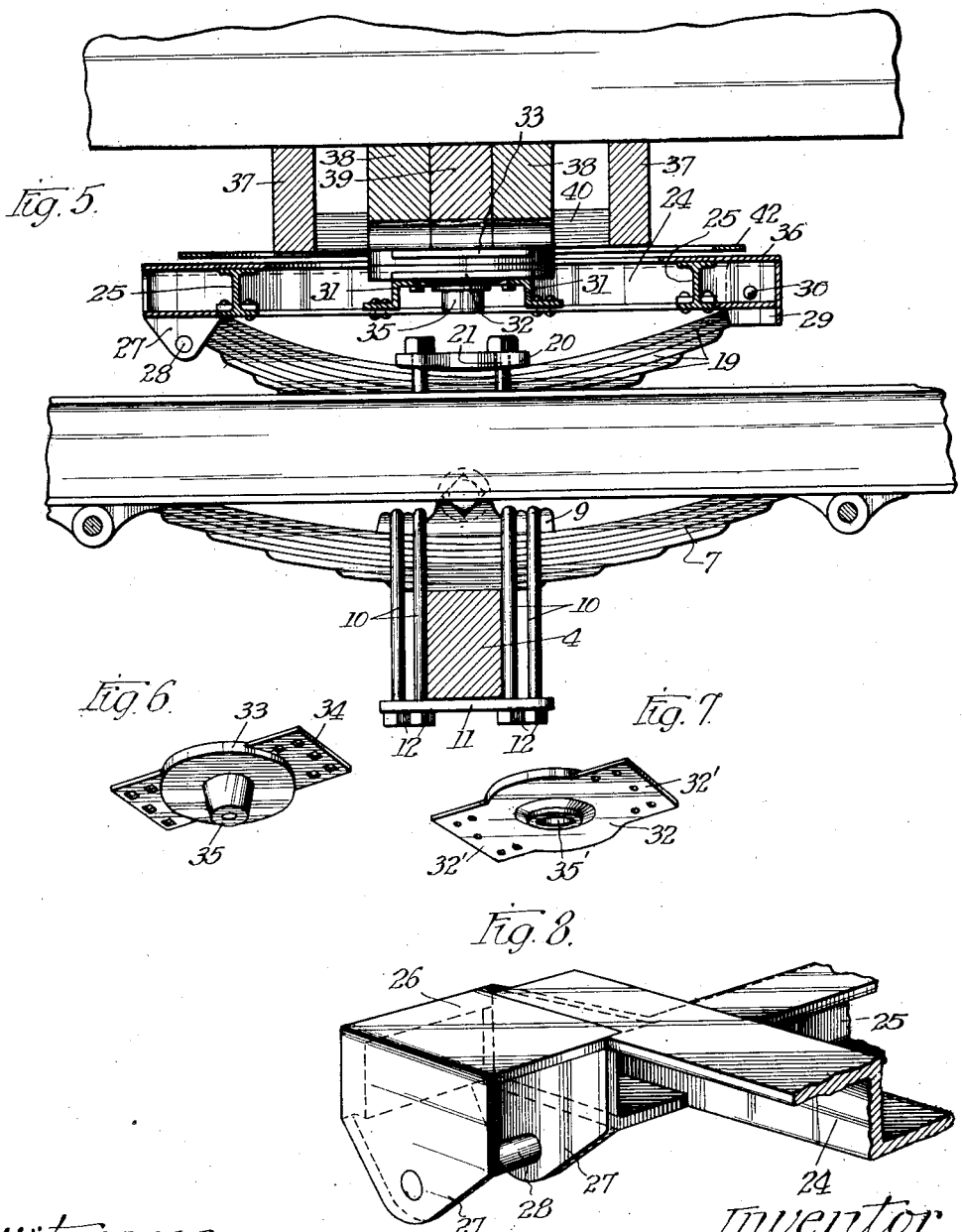

UNITED STATES PATENT OFFICE.

JACOB H. PRESS, OF CHICAGO, ILLINOIS.

MOTOR-VEHICLE.

1,348,241.      Specification of Letters Patent.      Patented Aug. 3, 1920.

Application filed November 12, 1915. Serial No. 61,098.

*To all whom it may concern:*

Be it known that I, JACOB H. PRESS, a citizen of the United States, residing in Chicago, in the county of Cook and State of Illinois, have invented certain new and useful Improvements in Motor-Vehicles, of the following description.

My invention belongs to that general class of devices known as vehicles, and relates particularly to a construction wherein a truck or tractor, as it may be called, is employed for drawing or pushing a trailer, the trailer consisting of a suitable body or body frame having its rear end suitably carried by supporting wheels, and its forward end carried by the tractor. The invention has among its objects the production of a device of the kind described that is simple, durable, efficient and satisfactory, that may be employed wherever found applicable. The invention has particularly among its objects a construction wherein any of the well known trucks on the market, or any other motor vehicles suitable for the purpose, may with slight changes, if any, be made suitable for carrying the trailer. The invention relates more specifically to a construction for pivotally and adjustably connecting the front end of the trailer to the truck or tractor, and supporting the end of the trailer in such a manner that the truck or the trailer may be rocked to compensate for roughness or irregularity of the road, without placing any strain upon the connection. By constructing the device as herein shown and described the tractive force is increased on the rear wheels of the truck, and the truck itself can at any time be disconnected from the trailer and the connection removed, so that the truck may be used in the ordinary manner. The truck or motor vehicle need not be changed at all, except that if desired the springs supporting the truck frame may be made lighter weight, as the trailer and its load are carried entirely independent of the truck frame. Many other objects and advantages of the construction herein described will be obvious to those skilled in the art to which the invention pertains.

To this end my invention consists in the novel construction, arrangement and combination of parts herein shown and described, and more particularly pointed out in the claims.

In the drawings, wherein like reference characters indicate like or corresponding parts, Figure 1 is a side elevation of the complete device;

Fig. 3 is a sectional view taken substantially on line 3, 3 of Fig. 4;

Fig. 4 is a sectional view taken substantially on line 4, 4 of Fig. 3;

Fig. 5 is a sectional view taken substantially on line 5, 5 of Fig. 4;

Fig. 6 is a perspective view of member 33;

Fig. 7 is a similar view of bearing member 32, and

Fig. 8 is a perspective view of a portion of the tiltable frame.

Figure 1:
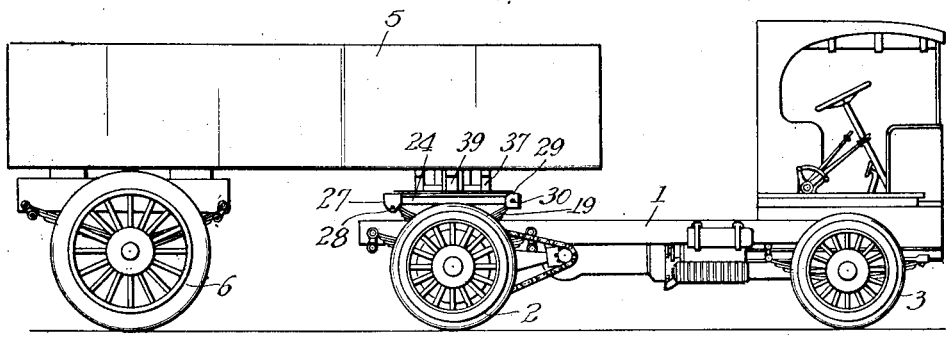

Referring to the drawings, in which the preferred form of my device is shown, 1 represents the frame of any style of truck or motor vehicle, provided with the usual rear wheels 2, and front wheels 3, the vehicle herein termed the tractor being driven, steered, and otherwise operated in any desired manner. Arranged to be drawn or pushed by the truck or tractor is the trailer, consisting of the body or frame 5, supported by a pair of rear wheels 6, in any desired or preferred manner. I have shown the body 5 in the form of a box, it being understood that 5 represents the frame regardless of the style of trailer, this depending upon the particular use for which the device is to be employed. The present invention consists of a construction arranged between the motor vehicle and the trailer, and connecting the same in such a manner that the vehicles can travel over uneven ground without straining the parts, with the load distributed on the trailer so as to increase the traction of the driving wheels 2, without requiring a re-construction of the tractor to make it applicable for the purpose.

Figure 2:
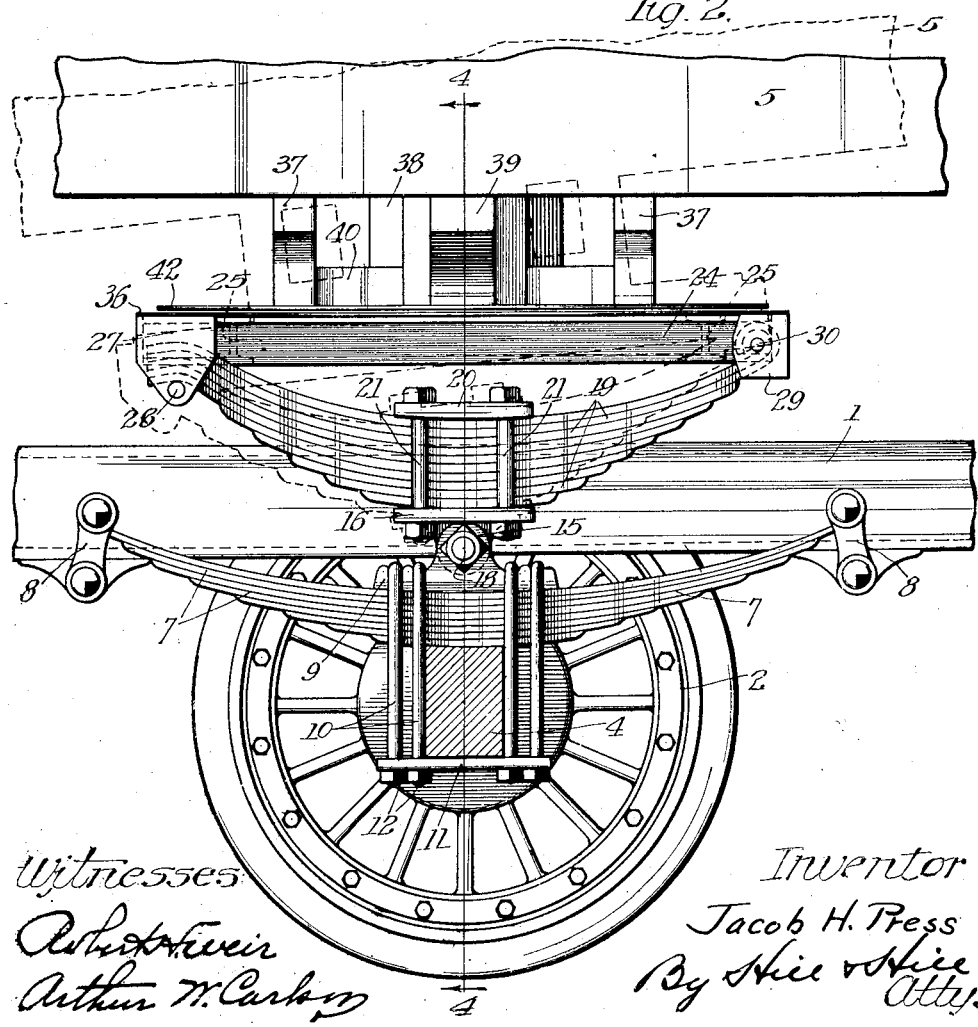
Fig. 2 is a sectional view taken substantially on line 2, 2 of Fig. 4.

Referring to the drawing, particularly Figs. 2, 4 and 5, 4 represents the rear axle of the vehicle, or in some cases the axle housing, or the equivalent, arranged to carry the frame 1. As shown, the frame 1 is supported by the usual springs 7 on each side, connected thereto by links 8 in any desired manner, this ordinarily depending upon the style of truck or motor vehicle to be used. In the construction shown each of springs 7, which consists of several leaves, is secured to the axle 4 by the bracket 9, bolts 10, nuts 12, and the plates 11, the construction representing substantially any of the constructions now in use, except that the spring 7 may be made somewhat lighter, as none of the weight of the trailer or its load is carried on the frame 1. Also the brackets 9 are arranged for a coöperating bracket on each side of the vehicle. I have shown the brackets 9 forked as at 15, 15, and a bracket 16 secured to each by a bolt 18 passing through the extension 17 and the extensions 15 (see Fig. 4). The brackets 16 may of course be carried by the axle or its housing in any equivalent manner. Carried by the brackets 16 on each side of the vehicle are springs 19, the same being secured together by a plate 20 and bolts 21, or the equivalents for the purpose. The springs 19 may be made of any desired strength and any number of leaves, this depending upon the load which is to be carried.

Each set of springs 19 is secured to a frame, consisting of the side bars 24 and cross-bars 25. (See Figs. 2, 3, 5 and 6.) The springs may be attached to the frame in any desired manner, so that the same is yieldingly supported by the springs. I have shown the frame provided with an extending bracket part 26 at each side secured to the Z-bars 24 of the frame or formed integral therewith, the same being provided with extending parts 27 carrying a pin 28. At the opposite corner or end of the frame part 24 are the parts 29, each of which carries a bolt 30. I have shown one end of the spring secured to bolt 30, and the opposite end adjustably carried by a bolt 28. As is obvious, when constructed as described, the frame is yieldingly supported by the springs, and yet freely tiltable backward or forward about the bolts or pivot points 18. This weight of the trailer and load is carried by the frame, and transmitted through the springs and brackets and substantially carried directly by the axle. The springs 7 between the brackets 9 and the axle form practically a rigid construction, the same transmitting no resiliency whatever.

The tiltable frame and trailer frame are pivotally secured together by means of the two coöperating plates 32 and 33, secured to the respective parts, or their equivalents for the purpose. As shown, plate 32 is provided with an opening therethrough, and flanged as at 32'. The same is supported and secured to the tiltable frame by means of the cross-bars 31, Z-bars being shown, these being secured to the flanges of the side bars 24. Plate 33 is flanged as at 34, and formed with a projecting part or pin 35, arranged to seat in the hole 35' of plate 32, so that the parts interengage. The flanges 34 are secured to the cross-bars or bolsters 38, forming a part of the trailer frame 5 and entering sockets formed by the members 40. Carried by the tiltable frame, and secured thereto, is an annular plate 36, arranged to coöperate with an annular ring or plate 42, secured to the bolster parts 38, 39 and 37. The two annular rings tend to maintain the parts in operative relation, and increase the bearing area in case of any rocking of the bearing member 33 on the member 32.

In the operation of the device the connection between the truck and trailer permits the turning in limited space, and as before stated, relieves the strain on the parts on uneven roadbeds. If the roadbed is such that the wheels 2 are above or below the line connecting the bottoms of the wheels 3 and 6, the tiltable frame tilts backward or forward, as the case may be, affording complete flexibility. By carrying the weight of the trailer on the rear axle or rear wheels, more weight may be carried at the forward end of the trailer, thereby increasing the traction of the truck, as well as obviating the necessity of rebuilding a truck, and providing a stronger frame for work of this kind where the same would not ordinarily be required. It also permits the rear end or portion of the body part of a motor vehicle, whether motor truck or pleasure car, to be removed, and the car used as a tractor when desired, or with a few minutes work, changed back again as usual as a pleasure vehicle or truck for any particular purpose.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. The combination of a motor driven vehicle comprising a frame, front and rear axles, front and rear supporting wheels and suspension springs connected with the rear axle and frame, a trailer including a frame and means for carrying the rear end portion thereof, and means for yieldably and pivotally supporting the forward portion of the trailer upon the rear axle of the vehicle independently of the vehicle frame and springs, said last mentioned means comprising auxiliary leaf springs disposed longitudinally of the vehicle frame and pivotally connected with the rear axle of the vehicle to rock in a vertical plane longitudinally of the vehicle frame, and bearings for said auxiliary springs carried by the means for securing the vehicle springs to the rear axle of the vehicle.

2. The combination of a motor driven vehicle comprising a frame, front and rear axles, front and rear supporting wheels and suspension springs connected with the rear axle and frame, a trailer including a frame and means for carrying the rear end portion thereof, and means for yieldably and pivotally supporting the forward portion of the trailer upon the rear axle of the vehicle independently of the vehicle frame and springs, said last mentioned means comprising auxiliary leaf springs disposed longitudinally of the vehicle frame and pivotally connected with the rear axle of the vehicle to rock in a vertical plane longitudinally of the vehicle frame, and bearings for the auxiliary springs carried by the securing means of the vehicle springs and located above said vehicle springs.

In testimony whereof, I have hereunto signed my name in the presence of two subscribing witnesses.

JACOB H. PRESS.

Witnesses:
 ROY W. HILL,
 CHARLES I. COBB.